United States Patent
Link et al.

(10) Patent No.: US 7,470,064 B2
(45) Date of Patent: Dec. 30, 2008

(54) AXIAL THRUST BEARING

(75) Inventors: Hermann Link, Neusaess (DE); Ferdinand Werdecker, Augsburg (DE)

(73) Assignee: MAN B&W Diesel AG, Augsburg (DE)

( * ) Notice: Subject to any disclaimer, the term of this patent is extended or adjusted under 35 U.S.C. 154(b) by 282 days.

(21) Appl. No.: 10/563,516

(22) PCT Filed: Jul. 5, 2003

(86) PCT No.: PCT/EP03/07207

§ 371 (c)(1), (2), (4) Date: Mar. 3, 2006

(87) PCT Pub. No.: WO2005/003577

PCT Pub. Date: Jan. 13, 2005

(65) Prior Publication Data

US 2006/0165325 A1 Jul. 27, 2006

(51) Int. Cl. *F16C 17/04* (2006.01)
(52) U.S. Cl. .................. 384/121; 384/368
(58) Field of Classification Search ............. 384/121, 384/123, 124, 303, 305, 368, 420
See application file for complete search history.

(56) References Cited

U.S. PATENT DOCUMENTS

| | | | | |
|---|---|---|---|---|
| 2,899,243 A | * | 8/1959 | Acterman | 384/121 |
| 4,348,065 A | | 9/1982 | Yoshioka et al. | |
| 4,479,728 A | * | 10/1984 | Miller | 384/369 |
| 4,863,291 A | * | 9/1989 | Heshmat et al. | 384/305 |
| 5,829,338 A | * | 11/1998 | Chrestoff et al. | 384/121 |
| 6,024,495 A | | 2/2000 | Loos et al. | |
| 6,419,049 B1 | * | 7/2002 | Joo | 384/123 |

FOREIGN PATENT DOCUMENTS

| | | |
|---|---|---|
| DE | 198 26 460 | 12/1999 |
| GB | 716 522 | 10/1954 |
| JP | 54 161318 | 10/1982 |
| JP | 60 018614 | 1/1985 |

OTHER PUBLICATIONS

Search report dated Jan. 7, 2004 issued for the corresponding International Application No. PCT/EP2003/007207.

* cited by examiner

*Primary Examiner*—Thomas R Hannon
(74) *Attorney, Agent, or Firm*—Cohen Pontani Lieberman & Pavane LLP

(57) ABSTRACT

An axial thrust bearing for axially supporting a rotating shaft of an exhaust gas turbocharger connected to a lubricating oil circuit includes a profiled annular bearing surface which contacts an essentially flat sliding surface, the bearing surface having a plurality of radially extending grooves which are open on the outside circumference, a plurality of coplanar flat trap surfaces located between respective pairs of adjacent grooves, and a plurality of wedge surfaces located between adjacent pairs of respective grooves. Each wedge surface forms a lubricating oil gap which narrows circumferentially toward an adjacent flat trap surface and which narrows radially toward the outside circumference.

7 Claims, 1 Drawing Sheet

AXIAL THRUST BEARING

PRIORITY CLAIM

Figure 1:
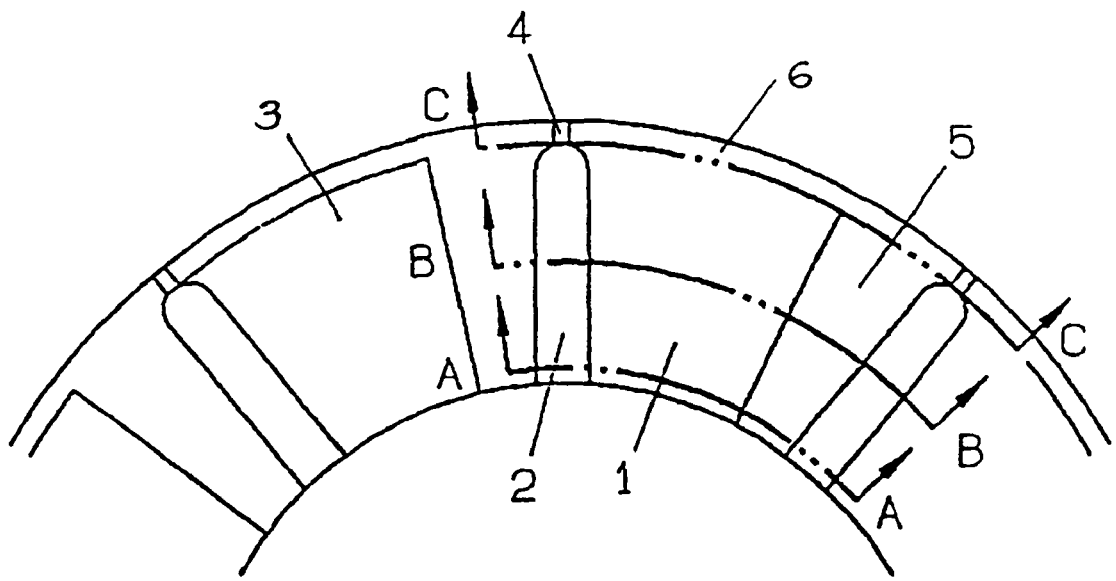

This is a U.S. national stage of application No. PCT/EP2003/007207, filed on 5 Jul. 2003.

BACKGROUND OF THE INVENTION

1. Field of the Invention

The invention pertains to an axial friction bearing for supporting the rotating shaft of an exhaust gas turbocharger connected to a lubricating oil circuit.

2. Description of the Related Art

Hydrodynamic axial thrust bearings are used in many cases to support exhaust gas turbochargers, that is, as plain bearings for the rotating shafts to absorb axial forces and to provide guidance in the axial direction.

Especially in the case of axial-flow turbochargers, the flow conditions produce high axial thrust, which is usually transmitted to the housing by a hydrodynamic axial thrust bearing provided with profiled bearing surfaces.

For example, U.S. Pat No. 6,024,495 discloses an axial friction bearing of this type which includes a bearing body, permanently connected to a bearing housing; a bearing comb, which rotates along with the shaft; and at least one lubricating gap, provided between the bearing box and the bearing comb. The gap is formed between the profiled surface of a ring and a flat sliding surface and is connected to an oil supply. A shoulder of the shaft, that is, the bearing comb seated on the shaft, therefore runs at least indirectly against an end surface of the stationary bearing housing. The surface of the ring has several radially oriented longitudinal oil grooves.

Dirt particles, however, are usually present in the lubricating oil, and the size of these particles is on the same order of magnitude as the thickness of the lubricating gap. The damaging effect of the dirt particles increases as the thickness of the lubricating gap decreases.

Various solutions have already been proposed to counteract this effect.

For example, according to U.S. Pat No. 6,024,495, axial friction bearings of this type are provided with a convergent lubricating gap, which is advantageous for developing hydrodynamic pressure, by machining wedge surfaces oriented in the circumferential direction into bearings in such a way that the lubricating gap is smallest in the area of the adjacent lubricating oil groove.

So that the flow-induced axial forces acting on the rotor can be absorbed in the case of axial thrust bearings with permanently machined-in wedge surfaces, a trap surface, across which a lubricating gap outlet extends, is provided next to each of the wedge surfaces.

Conformal surfaces are characteristic of hydrodynamic lubrication. A load-supporting pressure develops in the lubricating film when the lubricating gap narrows down, when a viscous lubricant is used, and when a sliding movement in the direction of the narrowing of the gap occurs. If sufficient lubricant is drawn into the convergent lubricating gap, the surfaces are completely separated by the lubricant, which is crucial to the prevention of wear and thus to the reliability of operation.

So that the requirements for low thrustal losses and acceptable oil throughputs can also be fulfilled, solutions are known which use a free-floating axial bearing disk between the rotor and the housing. In the design of an axial bearing with a free-floating disk, the oil has a high volume flow rate, because there are two lubricating gaps and because the centrifugal effect causes the oil to flow away across the wedge surface. This has the effect of decreasing the amount of pressure which can be built up along the wedge surface and of reducing the thickness of the lubricating gap.

Thus a rigid axial bearing unit already tested by the applicant comprises a fixed-segment bearing with lubricating grooves, each of which is bounded on the outside by a sealing web, through each of which a radially outward-leading dirt and cooling groove passes. These bearings have a good load capacity, but because of the high shear rate, they also have high thrust losses and a certain tendency to fail "spontaneously" (see below).

An axial bearing with a free-floating disk, which rotates around or with the shaft, is known especially from U.S. Pat No. 6,024,495, which is incorporated herein by reference. Here the wedge surface is bordered radially by an outer sealing web, and the sealing web is interrupted by a radially outward-leading dirt and/or cooling groove. The goal of this sealing web, which borders both the lubricating oil grooves and the wedge surfaces, is to decrease the amount of lubricating oil that can escape radially to the outside in the area of the wedge surfaces. This solution, too, suffers from the disadvantage that a design of this type also tends to fail spontaneously (see below).

The mechanism of spontaneous failure operates as follows: The lubricating gap has its minimum height at the sealing web. A high axial force requires the (hydrodynamic) buildup of greater compressive forces; greater compressive forces require a narrower lubricating gap; and a narrower lubricating gap or a smaller gap height at the sealing web decreases the volume flow rate of the oil. A decrease in the volume flow rate of the oil, however, leads to reduced cooling and to a higher average oil temperature; a higher average oil temperature leads to a sharp drop in the viscosity of the oil; and a sharp drop in the viscosity of the oil prevents in turn the buildup of hydrodynamic compressive forces. This effect is dominant over that by which a narrower lubricating gap causes higher compressive forces. The result is spontaneous failure, that is, the sudden collapse of the hydrodynamic compressive forces and the occurrence of mechanical contact between the thrust surfaces.

SUMMARY OF THE INVENTION

The task of the present invention is therefore to improve an axial thrust bearing of the type described above in such a way that the cited disadvantages (wear caused by particles, high throughput of lubricating oil, tendency to fail spontaneously, high thrust losses) can be prevented and especially so that an axial thrust bearing can be provided in which a sufficient oil volume flow rate with adequate pressure buildup in the lubricating gap is guaranteed, with the result that an outer sealing web on the profiled bearing surface can be eliminated.

This is achieved by a profiled annular bearing surface having a plurality of radially extending grooves which are open on the outside circumference, a plurality of coplanar flat trap surfaces located between respective pairs of adjacent said grooves, and a plurality of wedge surfaces located between adjacent pairs of respective grooves, wherein each wedge surface forms a lubricating oil gap which narrows circumferentially toward an adjacent flat trap surface and which narrows radially toward the outside circumference.

The hydrodynamic pressure is built up as a result of the shear rate in the lubricating oil in conjunction with a converging lubricating gap proceeding in the direction of the shear rate. The shear rate in the lubricating oil consists of a circumferential component (because of the relative rotational movement) and a radial component (because of continuity). By providing the wedge surface with an additional orientation in the radial direction, advantage can be taken of the radial component of the shear rate to build up additional hydrodynamic compressive force. The result is an increase in the thickness of the lubricating gap and thus a reduction in wear.

So that the radial component of the shear rate can be used to build up additional hydrodynamic compressive force, it is both desirable and necessary for the wedge surface to have a radial orientation and for lubricating oil to flow away in the radial direction. Because of the radial orientation of the wedge surface, however, there is also a convergent lubricating gap in the radial direction, which effectively prevents an excessive throughput of lubricating oil.

An increase in the axial force brings about a reduction in the thickness of the lubricating gap and thus also in the volume flow rate of the oil in the case of an axial bearing with radially oriented wedge surfaces as well. For continuity reasons, however, the radial velocity component of the lubricating oil remains more-or-less constant. The decrease in the thickness of the lubricating gap causes the additional hydrodynamic compressive force being produced to increase. As a result of this relationship, the volume flow rate of the oil is not throttled as severely as it is in the case of a conventional axial bearing with a sealing web. The average temperature and viscosity of the lubricating oil are therefore less sensitive to increases in the axial force, and the danger of spontaneous failure is effectively reduced.

Radially oriented wedge surfaces can be used both in the embodiment of a so-called rigid axial bearing (in which the relative angular velocity of the sliding surfaces is the same as the angular velocity of the shaft) and the embodiment with a free-floating disk between the two sliding surfaces. That is, in the latter case the bearing surface profiled in accordance with the invention is executed on the floating disk, which, for example, is located between a bearing comb on the rotating shaft and a sliding surface mounted directly or indirectly on a stationary bearing housing. In the latter embodiment, it is especially advantageous for the free-floating bearing disk to have the inventive profiling on both sides, especially a two-dimensional helical profiling of the wedge surface. Because the free-floating disk rotates at about half the angular velocity of the shaft and the because there are two lubricating gaps, the bearing losses are cut approximately in half.

The principle described above is applicable in particular to stationary and to rotating axial thrust bearing disks.

BRIEF DESCRIPTION OF TILE DRAWINGS

Figure 2C:
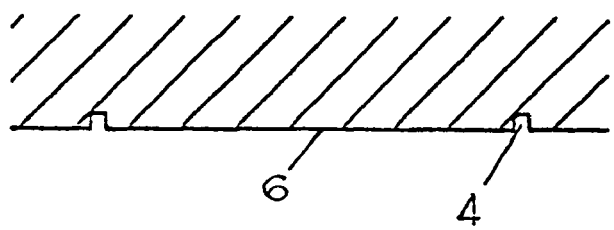
Figure 2B:
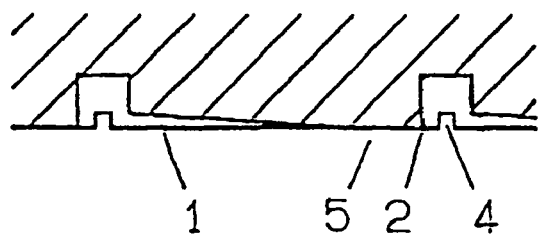
Figure 2A:
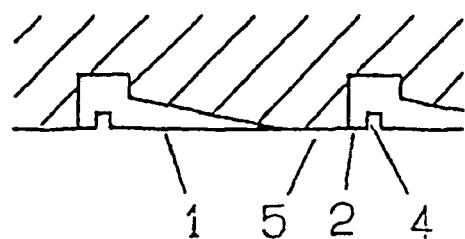

In the following, the invention is explained on the basis of the drawing:

FIG. 1 shows a partial view of the inventively profiled bearing surface in the form of the ring surface of a rigid bearing or of a floating disk; and FIGS. 2A-2C show three cross sections through the ring-shaped bearing surface of FIG. 1 proceeding in the radial direction from the inside out, namely, along lines A-A, B-B, and C-C in FIG. 1.

DETAILED DESCRIPTION OF THE PRESENTLY PREFERRED EMBODIMENTS

The exhaust gas turbocharger (not shown) consists essentially of the three housing parts, namely, a turbine housing, a bearing housing, and a compressor housing. In the known manner, a shaft is rotatably supported in the bearing housing by hydraulic radial bearings and also in axial thrust bearings, each of which is supplied with lubricating oil.

The special design of the axial thrust bearing is what is considered inventive within the scope of the object being described here, so that only the parts essential to an understanding of the invention are shown.

An axial friction bearing part has a bearing surface 3 in the form of a profiled annular surface, which has several lubricating oil grooves 2 distributed at regular intervals around the circumference of the annular surface, proceeding radially across that surface. Between each pair of lubricating oil grooves is a wedge surface 1 and an adjacent flat trap surface 5.

The lubricating oil grooves 2 are open at the inside circumference and thus make it possible for lubricating oil to be supplied from the oil circuit of the exhaust gas turbocharger. The lubricating oil grooves 2 are also open at the outer circumference, that is, in the direction toward the bearing housing, but they are narrowed down there by channels 4.

The wedge surfaces 1 have a convergent orientation both in the circumferential direction of the profiled ring surface 3 and in its radial direction, from the inside toward the outside, as a result of which a lubricating gap which tapers down in both of these directions is formed.

The convergent orientation of the wedge surfaces 1 in the circumferential direction is known from, for example, U.S. Pat No. 6,024,495. The additional convergent orientation of these wedge surfaces 1 in the radial direction is illustrated in the present FIGS. 2A-2C.

Thus the cross section A-A in the area of the inside circumference of the ring-shaped surface 3 close to the shaft shows that the thickness of the lubricating gap (i.e., the depth of wedge) is still comparatively large across the wedge surface. This thickness decreases, however, as we proceed from section B-B to section C-C toward the outside circumference of the ring-shaped surface 3 as far as the level of the trap surface 5. That is, the wedge surface converges from the inside circumference towards circumferential web 6 on the outside circumference. As shown in FIG. 2C, the top surface of web 6 is at the level of trap surface 5, except where channels 4 interrupt the web 6. The additional convergent orientation of the wedge surfaces in the circumferential direction of the ring surface 3 can be seen especially clearly in cross section A-A. From this (two-dimensional) superimposition of these two orientations, there results a helical wedge surface 1, which, in contrast to the embodiment of a "chambering" of the wedge surfaces toward the outside by means of a sealing web (see U.S. Pat No. 6.024.495), allows a thoroughly sufficient amount of lubricating oil to flow away in the radial direction over each wedge surface 1. In the manner previously described, furthermore, this design of the wedge surface takes advantage of the radial component of the lubricating oil volume flow rate to build up additional pressure, whereas the previously known variant with a sealing web makes it possible for the pressure to build up only in the circumferential direction of the ring-shaped surface, leading to the problems discussed in the introduction.

What is claimed is:

1. An axial thrust bearing for axially supporting a rotating shaft of an exhaust gas turbocharger connected to a lubricating oil circuit, the bearing comprising a profiled annular bearing surface which contacts an essentially flat sliding surface, the bearing surface comprising:

an inside circumference and an outside circumference which bound the bearing surface radially;

a plurality of grooves extending radially from the inside circumference to the outside circumference, said grooves being open on the outside circumference;

a plurality of coplanar flat trap surfaces located between respective pairs of adjacent said grooves such that only one of said flat trap surfaces is arranged between each of the respective pairs of adjacent grooves; and a plurality of wedge surfaces located between adjacent pairs of respective said grooves such that only one of said wedge surfaces is arranged between each of the respective pairs of adjacent grooves, each said wedge surface forming a lubricating oil gap which narrows circumferentially toward an adjacent said flat trap surface and which narrows radially toward said outside circumference such that a shear rate includes circumferential component and a radial component.

2. The axial thrust bearing of claim 1 comprising a floating annular disk, said profiled annular bearing surface being executed on said floating annular disk, said disk being mounted between a bearing comb on the rotating shaft and a sliding surface on a stationary bearing housing.

3. The axial thrust bearing of claim 2 wherein said profiled annular bearing surface is provided on both sides of said annular disk, each said bearing surface contacting an essentially flat sliding surface.

4. The axial thrust bearing of claim 3 wherein at least one said flat sliding surface is stationary with respect to said rotating shaft, said annular disk being designed to rotate around said shaft and with said shaft.

5. The axial thrust bearing of claim 1 wherein said profiled annular bearing surface further comprises a circumferential web on the outside circumference, the circumferential web having a bearing surface which is coplanar with the flat trap surfaces, the circumferential web being interrupted by said grooves.

6. The axial thrust bearing of claim 5 wherein each said groove comprises a channel where the groove passes through the circumferential web, the channel being narrower than a radially inner part of the groove.

7. The axial thrust bearing of claim 1, wherein a radial flow of lubricating oil in the wedge surfaces causes the radial component of the shear rate.

* * * * *